No. 735,732. Patented August 11, 1903.

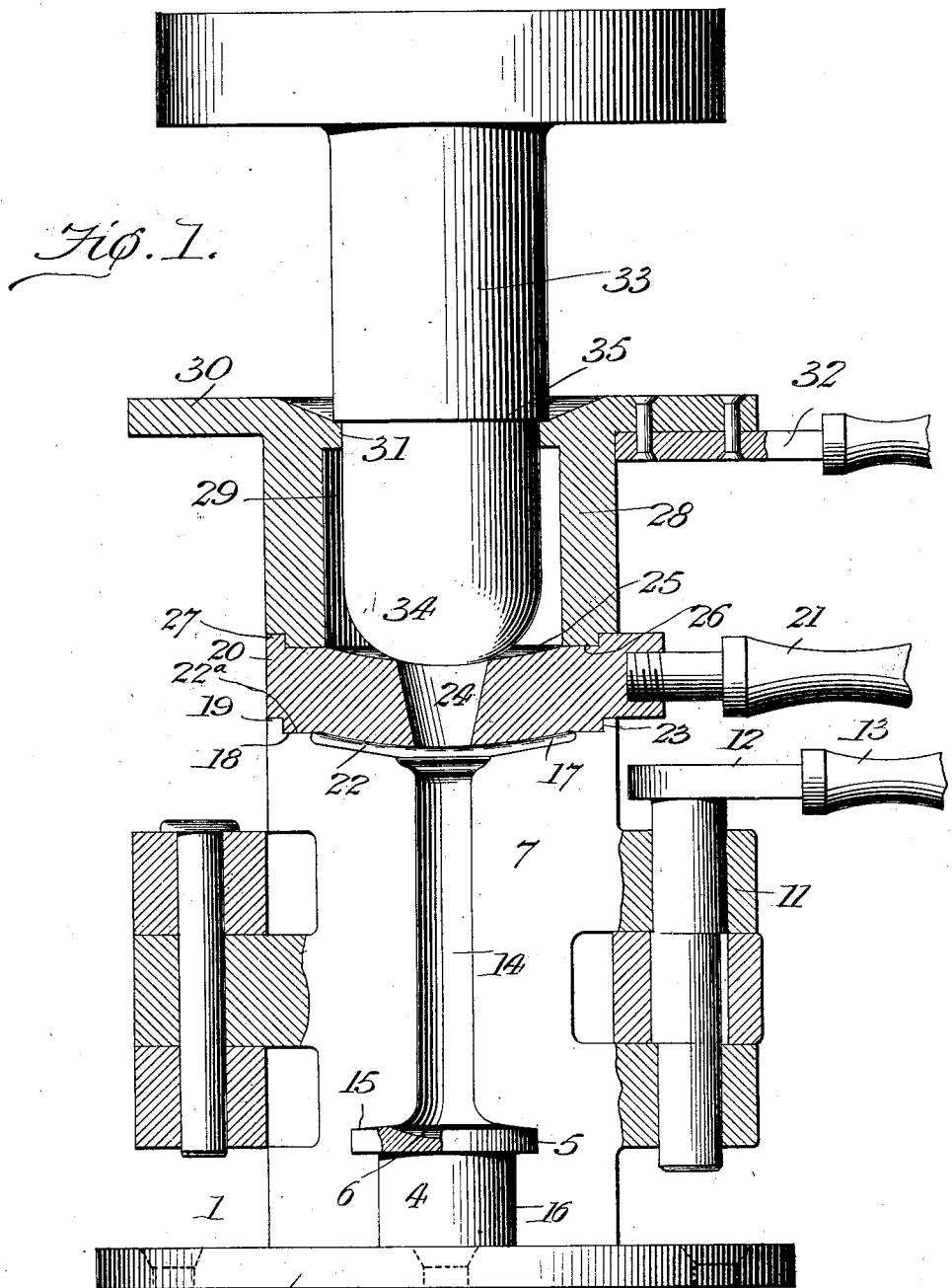

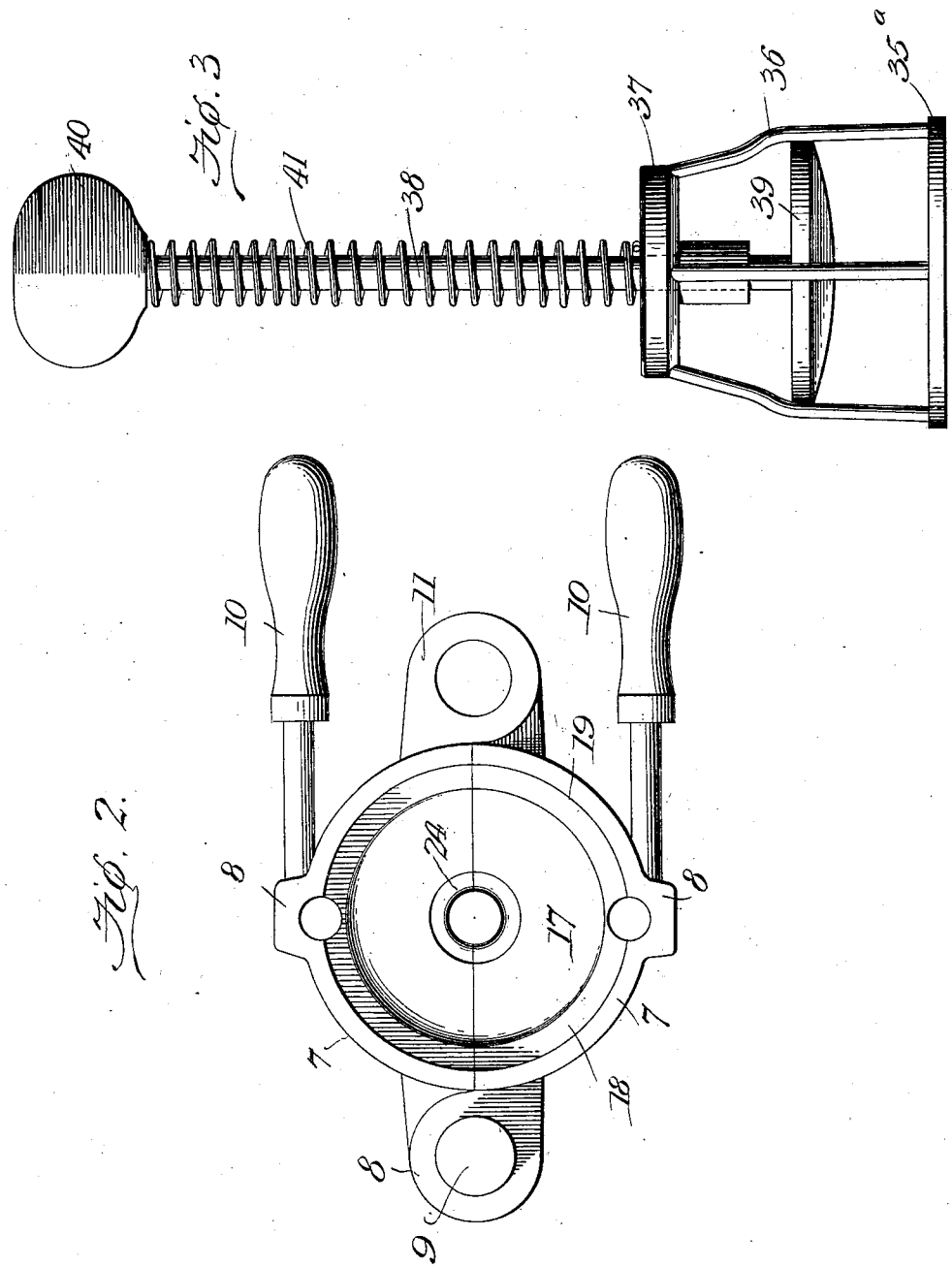

UNITED STATES PATENT OFFICE.

CURTIS G. DREW, OF TIFFIN, OHIO.

MANUFACTURE OF INTEGRAL STEMS AND BASES FOR BLOWN BOWLS.

SPECIFICATION forming part of Letters Patent No. 735,732, dated August 11, 1903.

Application filed March 20, 1903. Serial No. 148,772. (No model.)

*To all whom it may concern:*

Be it known that I, CURTIS G. DREW, a citizen of the United States, residing at Tiffin, in the county of Seneca and State of Ohio, have invented a new and useful Manufacture of Integral Stems and Bases for Blown Bowls, of which the following is a specification.

This invention relates to the manufacture of integral stems and bases for blown bowls for glass goblets.

In the manufacture of goblets with blown bowls and stems and bases attached thereto the common practice is to fuse the molded stem at one end to the lower portion of the blown bowl and at the other end of said stem to fuse on a mass of glass in plastic condition and shape the stem in any suitable manner by the use of hand-tools or to mold the stem with a mass of glass sufficiently large to form the base attached thereto, but not of the shape which the base must finally receive. The stem, with the lump of glass for forming the base attached thereto, is removed from the mold, and when it is desired to form the base the lump of glass provided therefor is reheated until it becomes soft enough to be shaped with hand-tools in the ordinary manner. Another method of forming stems and bases for the blown bowls of goblets of which I am aware consists in casting the stem and the base integral and leaving the surplus glass at the upper end of the stem, where it may be formed into suitable shape for connecting with the bowl of the goblet when that is fused onto the stem.

There are disadvantages inherent in both of the methods above outlined; and the invention hereinafter disclosed has for its object to avoid the objectionable features of both of said methods.

The objection to the method first mentioned above, which is the method most generally used, is that the bottoms of glasses formed by that method are seldom of the same form and size and the operation of making the stem and base by that method is one requiring considerable time, and therefore adds materially to the cost of the finished article.

The objectionable features of the second method for forming the stem and base for a blown bowl are that while the bases produced by that method are uniform the amount of glass entering into the stems will vary somewhat and considerable time is required to shape the surplus glass at the upper end of the stem into proper form for the attachment of the glass bowl thereto. This time required varies according to the amount of surplus glass to be suitably shaped and adds to the cost of the finished article almost as much as the method of shaping the base by hand.

My invention consists, generally speaking, in providing means whereby the stem and base may be cast integral without any excess of glass being included therein, the integral stem and base so formed as to be ready for attachment without further shaping to a blown glass bowl of a goblet.

In the accompanying drawings, forming a part of this specification, there is shown one form of embodiment of the invention capable of carrying the same into practical use, it being understood that changes may be made in the form, proportions, and exact mode of assemblage of the elements therein shown without departing from the spirit of the invention or going beyond the scope of the appended claim.

In the drawings, Figure 1 is a view, chiefly in vertical section, through a mold adapted for use in the manufacture of integral stems and bases according to my method. Fig. 2 is a plan view of the hinged sections of the mold shown in Fig. 1. Fig. 3 is a view in side elevation of a presser to be used in connection with the hinged sections shown in Figs. 1 and 2.

In the above-mentioned views corresponding parts are designated by the same characters of reference throughout.

Referring to the drawings, 1 designates a suitable base member for a mold for making integral stems and bases for blown-glass bowls. The base member 1 comprises a disk 2, which rests on the bed-plate of a press, and a central stem 4, having at its top a disk 5 of greater diameter than said stem formed integral therewith and having on the upper surface thereof a shallow depression 6, as shown. Supported upon the base 1 are two hinged hollow sections 7 7, connected together by lugs 8, and a suitable pintle 9, engaging said lugs, having attached to the outer surfaces thereof handles 10 and being provided with lugs 11, pierced to admit an eccentric locking-pin 12 of the usual form. The locking-pin 12 is provided with a handle 13, as shown. The hollow sections 7 7 are exactly similar in interior formation, each having a vertical groove 14 of semicircular cross-section flared at the top and bottom, as shown. At the bottom each of the sections 7 is provided with a recess 15, adapted to fit the disk 5 on the base-section, and below the recesses 15 a groove 16, which is adapted to fit the stem 4 of the base-section. With the hinged sections 7 7 formed as described it will be seen that they may be closed over the stem 4 and disk 5 on the upper portion thereof and securely held by the engagement of the disk with the recesses 15, provided each on the interior of the ends of the hinged sections 7. It will also be observed that the flaring end of the groove 14 for the formation of the stem of the goblet is made above the shallow depression 6 in the disk 5, so that the disk, with its depression 6, coöperates with the sections 7, having the groove 14 formed with a flaring end, as shown, to form a sort of boss at one end of the stem for the purpose hereinafter to be explained.

At the upper end of the groove 14 in each of the sections 7 are provided exactly similar semicircular depressions 17 in the top of said sections, each having a slight incline downward and toward the center, so that when sections 7 are brought together and the sections 14 form a suitable mold for the stem the depressions 17 will unite to form a suitable mold for one surface of the base, which is to be cast integral with the stem. There is also provided on the upper surface of the hinged sections 17 an annular seat 18 for an upper mold-section presently to be described and a flange 19 to retain said mold-section in position.

The upper mold-section used in combination with the hinged sections 7 and base 1 comprises a circular member 20, provided with a handle 21, as shown, and having on its lower surface 22 a slightly-convex circular central portion, which is surrounded by the annular flat surface $22^a$, adapted to fit upon the seat 18, provided on the upper end of the mold-sections 7 and rabbeted at 23 to permit engagement with the guard-flange 19 on the hinged sections 7, so as to form a mold for the base of a goblet of thin blown glass.

The mold-section 20 is centrally pierced by a downwardly-tapering vertical opening 24, and its upper surface comprises a central concave portion 25, an annular flat surface 26, surrounding said concave portion 25 and forming a seat for a superposed mold-section, such as is presently to be described, and a guard-flange 27 at the outer margin of said seat 26.

To rest on the top of the mold-section 20, I provide a section 28, having its lower end adapted to fit the upper surface of the section 20 and to be retained thereon by the guard-flange 27 and having a large internal bore 29, adapted to receive a mass of molten glass, as will presently be explained. At the top of section 28 I provide a wide flange 30, having a central opening 31 of somewhat less diameter than the bore 29 and having adjacent to the opening 31 on its upper surface a slight depression. Attached to the under surface of the flange 30 is a handle 32, by means of which the member 28 may be handled.

To coöperate with the member 28, I provide a plunger 33, having the operating portion 34 thereof rounded at the end, as shown, and having provided at the rear of said operating portion 34 a shoulder 35 to contact with the depressed portion of the upper surface of the flange 30 to limit the movement of the plunger through the opening 31 in said flange. The plunger 33 is secured to the upper movable part of a press of any suitable form and operates in the manner which will presently be described.

In practice the hinged sections 7 are secured in position upon the base 1, with the disk 5 seated in the recess 15, provided therefor in the hinged sections 7, and are locked in firm contact with each other by means of the lugs 11 and the eccentric-rod 12. The upper mold-section 20 is then positioned on the upper surface of section 7, and the section 28 is superposed on the section 20, as shown in Fig. 1. When the various parts of the mold are thus assembled, a quantity of molten glass sufficient for the formation of the stem and base to be formed integral therewith is introduced through the opening 31 into the bore 29 of the member 28, and the plunger 33 is then brought downward and passes through the opening 31 and into contact with the molten glass within the mold-section 28. The plunger forces down through the tapered central opening 24 a sufficient quantity of molten glass to fill completely the grooves 14 and the depressions 17 of the mold-sections 7, thus forming a stem and base integral therewith.

The quantity of molten glass introduced into the mold-sections will of course be more than that actually required for the formation of the stem and its attached base in order that the pressure exerted upon the plunger may be effective to completely fill the space in the mold-sections 7 and between said sections and the upper section 20. The surplus glass will extend upward from the base formed between section 20 and sections 7, through the opening 24, and into the space above mold-section 20. Owing to the tapered form of the opening 24, the connection of the surplus mass of glass with the base formed under the mold-section 20 is slender, and when the parts of the mold are disassembled, the plunger 33 being first removed and then the mold-section 28 being removed, the surplus glass may be readily removed by lifting slightly the section 20 by means of the handle attached thereto and severing with shears the slender connection extending downward from the molten glass supported by the section 20 to the base lying in the recesses 17 at the top of sections 7.

In order to finish the base formed in the manner explained and to remove the small boss left on the surface of the base by the action of the shears in severing the connection of the base with the surplus glass, I then make use of a presser of suitable construction to smooth down said boss and spread it over the base, so that it will not be noticeable. Sometimes the surplus glass will be severed from the base by merely lifting the mold-section 20 from its position on the top of sections 7. When this is the case, however, the base will have an irregular projection of glass in a plastic state attached thereto, and the presser must be used to smooth it down. It is to be understood that the boss or irregular projection left on the surface of the base when the surplus of molten glass is removed is not worked into the base and has no effect upon the shape thereof, but is simply flattened down, so as to make the bottom of the base smooth and regular. The quantity of glass in the boss or irregular projection is so slight that the flattening is not absolutely necessary, but is desirable in order to make the base smooth and not leave recesses for the accumulation of dirt therein.

The presser which is used for smoothing down the boss or irregular projection on the under surface of the base is preferably of the form shown in Fig. 3 and consists of a supporting-frame comprising an annular base 35ª, three posts 36 36 36, extending upward therefrom and having their upper portions bent toward a common center, a guide member 37, mounted on said posts 36 36 36, and a spring-supported plunger 38, slidably mounted in said guide member 37 and having at its lower end a rounded presser-face 39 and at its upper end a head or handle. Surrounding the stem of the plunger 38 is a coiled spring 41, having one end in contact with the upper surface of the guide member 37 and the other engaging the end surface of the head or handle 40.

The annular base 35ª is of such dimensions that it will fit readily into the annular seat 18, provided on the upper surface of mold-sections 7 7, so that the presser-face 39 will be brought into contact with the projection of plastic glass at the center of the base formed in the depressions 17 on the upper surface of said mold-sections 7.

It is to be noted that my method of manufacturing the integral stems and bases for blown-glass goblet-bowls differs from methods heretofore used in forming integral stems and bases in that the stem and base are cast in inverted position. This procedure is of importance for two reasons. First, the base formed in this way is more perfect than a base formed at the bottom of the mold in the ordinary manner. This method necessarily causes the molten glass to become less cooled in passing from the upper portion of the mold, as the chamber 29 in mold-section 28, to the depression in which the base is formed in my improved mold than it would in passing from said chamber 29 all the way to the lower end of grooves 14. Furthermore, there is less danger from the action of air-bubbles upon the glass when the base is formed in the upper portion of the mold. The second advantage of this method of manufacturing integral stems and bases by molding the stem and base in inverted position is that it is possible to remove the surplus glass from its attachment to the under surface of the base, and thus insure the production of stems and bases of absolutely uniform dimensions.

At the lower end of the stem as molded in the apparatus above described there is formed a small boss which was mentioned in a preceding paragraph, but no utility therefor pointed out. This boss is provided merely to form a suitable surface for the attachment of the stem to the goblet-bowl, and the attachment is accomplished by merely pressing the end of the stem (in this case the boss formed thereon) into contact with the under surface of the bowl. When the stem is removed from the mold, it is still hot enough to fuse to the goblet-bowl without reheating.

Having thus described the nature and uses of my invention, what I claim as new, and desire to secure by Letters Patent, is—

The method of manufacturing integral stems and bases for blown-glass goblet-bowls consisting in molding by pressure an integral stem and base in inverted position, leaving the surplus glass attached to the upper surface of the base as molded and subsequently removing said surplus glass and smoothing by pressure the surface irregularities left when said surplus glass is detached.

In testimony that I claim the foregoing as my own I have hereto affixed my signature in the presence of two witnesses.

CURTIS G. DREW.

Witnesses:
MARK L. LEISTER,
ROSCE J. DREW.